US009171266B2

(12) United States Patent
Hinchey et al.

(10) Patent No.: US 9,171,266 B2
(45) Date of Patent: Oct. 27, 2015

(54) POWER PROVISION BASED ON SELF-SACRIFICING CRAFT

(75) Inventors: Michael G. Hinchey, Bowie, MD (US); Emil I. Vassev, Montreal (CA); Bridget Hinchey, Limerick (IE); Roy Sterrit, Newtownabbey (GB)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 309 days.

(21) Appl. No.: 13/606,174

(22) Filed: Sep. 7, 2012

(65) Prior Publication Data

US 2013/0132317 A1 May 23, 2013

Related U.S. Application Data

(63) Continuation-in-part of application No. 12/569,422, filed on Sep. 29, 2009, now Pat. No. 8,275,724.

(60) Provisional application No. 61/105,474, filed on Oct. 15, 2008.

(51) Int. Cl.
*G06F 15/18* (2006.01)
*G06N 99/00* (2010.01)
*G06N 5/02* (2006.01)
*G06N 3/00* (2006.01)

(52) U.S. Cl.
CPC ............... *G06N 99/005* (2013.01); *G06N 3/004* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 6,904,335 B2 * | 6/2005 | Solomon | 700/247 |
| 2006/0122952 A1 * | 6/2006 | Hinchey et al. | 706/13 |
| 2008/0056933 A1 * | 3/2008 | Moore et al. | 422/1 |
| 2010/0036556 A1 * | 2/2010 | Na et al. | 701/26 |

OTHER PUBLICATIONS

Customization of component based object request brokers through dynamic reconfiguration Eddy Truyen et al 2000 IEEE.*
Asteroid Exploration with Autonomic Systems Walt Truszkowski et al Proceedings of the 11th IEEE International Conference and Workshop on the Engineering of Computer-Based Systems (ECBS'04) 0-7695-2125-Aug. 2004 $ 20.00 © 2004 IEEE.*
A Prototype Model for Self-Healing and Self-Reproduction In Swarm Robotics System Yuan-Shun Dai et al Proceedings of the 2nd IEEE International Symposium on Dependable, Autonomic and Secure Computing (DASC'06) 0/7695-2539-Mar. 2006 $20.00 © 2006.*

(Continued)

*Primary Examiner* — Kakali Chaki
*Assistant Examiner* — Luis Sitiriche

(57) ABSTRACT

A biologically-inspired system and method is provided for self-adapting behavior of swarm-based exploration missions, whereby individual components, for example, spacecraft, in the system can sacrifice themselves for the greater good of the entire system. The self-sacrifice can involve donating resources or assets, such as power provisions, to a different component of an autonomous system. A receiving component of the system can benefit from receiving the donated resource or power provision.

30 Claims, 8 Drawing Sheets

(56) References Cited

OTHER PUBLICATIONS

Formal Approaches to Agent-Based Systems James L. Rash et al First InternationalWorkshop, FAABS 2000 Greenbelt, MD, USA, Apr. 5-7, 2000 Revised Papers.*

CONRO: Self-Reconfigurable Robots Peter Will et al Information Sciences Institute University of Southern California Marina del Rey,CA 90292 Sep. 2003 Final Report.*

* cited by examiner

I. Autonomic System (AS)
- AS Service-Level Objectives
- AS Self-Management Policies
- AS Architecture
- AS Actions
- AS Events
- AS Metrics II. AS Interaction Protocol (ASIP)
- AS Messages & Negotiation Protocol
- AS Communication Channels
- AS Communication Functions III. Autonomic Element (AE)
- AE Service-Level Objectives
- AE Self-Management Policies
- AE Friends
- AE Interaction Protocol (AEIP)
    - AE Messages & Negotiation Protocol
    - AE Communication Channels
    - AE Communication Functions
    - AE Managed Resource Interface
- AE Recovery Protocols
- AE Behavior Models
- AE Outcomes
- AE Actions
- AE Events
- AE Metrics

FIG. 2

```
1.   AECLASS Worker {
2.     AESELF_MANAGEMENT {
3.       OTHER_POLICIES {
4.         SELF_SACRIFICE {
5.           FLUENT unableToExplore {
6.             INITIATED_BY {EVENTS.instrIsNonfunctional }
7.              TERMINATED_BY {EVENTS.canBeRuler, EVENTS.canBeMessenger,
8.                 EVENTS.canBeShield, EVENTS.mustBeDestroyed }
9.           }
10.          FLUENT inTransformToRuler {
11.            INITIATED_BY { EVENTS.canBeRuler }
12.            TERMINATED_BY { EVENTS.transformedToRuler,
13.                EVENTS.canBeMessenger, EVENTS.canBeShield }
14.          }
15.          FLUENT inTransformToMessenger {
16.            INITIATED_BY { EVENTS.canBeMessenger }
17.             TERMINATED_BY { EVENTS.transformedToMessenger,
18.                EVENTS.canBeRuler, EVENTS.canBeShield }
19.          }
20.          FLUENT inTransformToShield {
21.            INITIATED_BY { EVENTS.canBeShield, EVENTS.transformedToShield }
22.            TERMINATED_BY { EVENTS.mustBeDestroyed }
23.          }
24.          FLUENT inSelfDestruction {
25.            INITIATED_BY { EVENTS.mustBeDestroyed }
26.          }
27.          MAPPING {
28.            · CONDITIONS { instrIsNonfunctional }
29.            DO_ACTIONS { ACTIONS.checkTransformation } }
30.          MAPPING {
31.            CONDITIONS { inTransformToRuler }
32.            DO_ACTIONS { ACTIONS.transformToRuler } }
33.          MAPPING {
34.            CONDITIONS { inTranformToMessenger }
35.            DO_ACTIONS { ACTIONS.transformToMessenger } }
36.          MAPPING {
37.            CONDITIONS { inTransformToShield }
38.            DO_ACTIONS { ACTIONS.transformToShield } }
39.          MAPPING {
40.            CONDITIONS { inSelfDestruction }
41.            DO_ACTIONS { ACTIONS.selfDestroy } }
42.        }
43.      }
44.    }//AESELF_MANAGEMENT
       ....
45.    ACTIONS { .... }
46.    EVENTS { .... }
47.    METRICS {
48.      METRIC movingAbility { .... }
49.      METRIC antennaAvailability { .... }
       ....
50.    }
51.  }
```

FIG. 3

```
1.  ACTIONS {
2.      ACTION transformToShield {
3.          ENSURES { METRICS.Moving.Ability.VALUE > 0 }
4.          DOES {
5.              remove AESLO { };
6.              add AESLO { SLO shieldWorkers {....} };
7.              change AESELF_MANAGEMENT.SELF_HEALING { SWITCH (OFF) };
8.              change AESELF_MANAGEMENT.SELF_PROTECTING { SWITCH (OFF) };
9.              change AESELF_MANAGEMENT.SELF_ADAPTING { SWITCH (OFF)};
10.             change AESELF_MANAGEMENT.SELF_OPTIMIZING { SWITCH (OFF) };
11.     // produce the necessary shield actions and events that prompt these actions
12.             add EVENTS { EVENT timeToShield {....} };
13.             add ACTIONS { ACTION shieldAction {....} };
14.             call IMPL doShieldTransformation
15.         }
16.         TRIGGERS { EVENTS.transformedToShield }
17.         ONERR_TRIGGERS { EVENTS.mustBeDestroyed }
18.     }
19.     ACTION transformToRuler { ....
20.         DOES {
21.             call IMPL saveAESPEC;
22.             call ASIP.FUNCTIONS.sendRulerSpecRequest;
23.             call ASIP.FUNCTIONS.receiveRulerSpecification;
24.     //remove the old spec structures
25.             remove AESLO { };
26.             remove AESELF_MANAGEMENT { };
                ....
27.     //produce the new spec structures based on the received spec
28.             add AESLO {.... };
29.             and AESELF_MANAGEMENT { SELF_HEALING {....} };
                ....
30.             call IMPL doRulerTransformation
31.         }
32.         ONERR_DOES ( call IMPL restoreAESPEC )
33.         TRIGGERS { EVENTS.transformedToRuler }
34.         ONERR_TRIGGERS {
35.             IF METRICS.antennaAvailability.VALUE > 80 THEN
36.                 EVENTS.canBeMessenger
37.             END ELSE
38.                 EVENTS.canBeShield
39.             END
40.         }
41.     }
        ....
42. }
```

FIG. 4

POWER PROVISION BASED ON SELF-SACRIFICING CRAFT

CROSS-REFERENCE TO RELATED APPLICATION

The present application is a continuation-in-part of U.S. patent application Ser. No. 12/569,422, filed Sep. 29, 2009 now U.S. Pat. No. 8,275,724, which in-turn claims a benefit from prior U.S. patent application Ser. No. 61/105,474, filed Oct. 15, 2008, each of which is incorporated herein in its entirety by reference.

STATEMENT OF GOVERNMENT INTEREST

The invention described herein was at least in-part made by an employee of the United States Government and may be manufactured and used by or for the Government of the United States of America for governmental purposes without the payment of any royalties thereon or therefor.

FIELD

The present invention relates generally to the field of artificial intelligence, to architecture for collective interactions between autonomous entities, and to the conservation of resources in an autonomous system.

BACKGROUND

Future space probes that operate in cooperative swarms must self-sacrifice if they begin to fail and risk damaging their neighbors in the swarm. Swarm-based missions may be the wave of the future, whereby space exploration is undertaken not by one large spacecraft but by swarming formations of much smaller, cheaper ones. Such smaller spacecraft could collectively provide a "floating optics" system for a space telescope comprising, for example, separate spacecraft flying in formation. In such a system, however, if one spacecraft in the swarm begins to fail and risks a calamitous collision with another, it must sense its end is nigh and put itself on a course that takes it forever away from the swarm, for the greater good of the collective. Failing that, perhaps because it has too little fuel to move away, it must "passivate" itself by deactivating all its systems. This would mean discharging its batteries so as to pose no risk of shock in a collision, and venting any last vestiges of fuel that could explode in a crash. Then its neighbors would be programmed to navigate around the lifeless satellite. When certain failure modes are sensed, the craft must self-sacrifice voluntarily by transformation or self-destruction. This is analogous to the way bee colonies operate, with the workers cooperating to ensure that the mission, that is, reproduction by the queen, succeeds at all costs, even at their own peril.

The common goals of much contemporary software development are related to quality, flexibility, security, and exploiting emergent behavior, which imply an inherent need for self-management and self-monitoring. There are many examples of emergent behavior in the insect world. For example, when it gets cold, the worker bees gather around the queen bee to warm her with the heat of their bodies, resulting in some of them freezing to death. In another example, bee stingers are a relatively strong defense mechanism for protecting a hive, but whenever a bee stings, it dies. In yet another example, the soldier termites defend the colony by blocking the tunnels with their body. Usually more soldiers stand by behind the initial soldier so once the first one falls, another soldier will take his place. In the case that the intrusion is coming from a large breach that cannot be blocked by a single soldier, more solder termites form a phalanx-like formation that blocks the entire breach, until the latter is repaired by other termites.

In human beings, the self-destruction behavior of human body cells is considered as an intrinsic safety mechanism of the human body. It seems that the lifetime of a cell is programmed and that cells know when to commit suicide. This self-destruction is an intrinsic property that can be delayed due to the continuous receipt of biochemical reprieves. This process, also known as "death by default", or apoptosis, prevents cells from dying due to constant receipt of biochemical "stay alive" reprieve signals. Investigations into the apoptosis process have discovered that whenever a cell divides, it commits suicide due to lack of reprieve signals. It is believed that the reason for this is self-protection, as the most dangerous time for the body is when a cell divides, since if just one of the billions of cells locks into division the result is a tumor.

Moreover, metamorphosis and transformation processes are observable in different species. Metamorphosis is a biological process whereby a living organism physically changes its form or structure during development. Perhaps the most notable form of metamorphosis is the transformation from the immature insect into the adult form. Another form of metamorphosis is observed in chameleons, which are famous for their ability to change their skin color to blend in with their surroundings.

Furthermore, there are living organisms called sequential hermaphrodites (or dichogamy) which are organisms born as one sex and which then later change into the other sex. A few species in this group can change gender multiple times, but they can only function as one sex at a time. Unlike humans, the DNA of these species does not determine their gender, allowing full functional gender change without modifying the DNA.

It should be understood that emergence is not about complexity and simplicity, but is more about features that, being not present at a local level, appear at a global level, but whose uncontrolled appearance may result in greater levels of complexity.

Biologically-inspired computing adopts biological approaches to effective problem solving, where solutions developed by nature through millions of years of evolution are applied in the computing milieu.

Sterritt and Hinchey describe self-destruction in agent-based systems as a last resort situation to prevent further damage that can be due to race conditions or undesirable emergent behavior. In their approach, they propose an apoptosis "stay alive" construct used to confirm that if an agent is still within the correct context and behavior it should stay alive and not self-destruct. See, R. Sterritt and M. G. Hinchey, "Apoptosis and Self-Destruct: A Contribution to Autonomic Agents?", *Proc. FAABS-III, 3rd NASA/IEEE Workshop on Formal Approaches to Agent-Based Systems*, Greenbelt, M D, Springer Verlag (2005), which is incorporated herein in its entirety by reference.

Hartline describes a premature termination of a mobile agent from a malicious host in order to facilitate security measures. See, J. D. Hartline, Mobile Agents: A Survey of Fault Tolerance and Security. University of Washington, (1998), which is incorporated herein in its entirety by reference.

Chapelle et al. propose an architecture of cooperative agents where, due to a satisfaction model and local signals, agents learn to select behaviors that are well adapted to their neighbor's activities. See, J. Chapelle, O. Simonin, and J.

Ferber, "How Situated Agents can Learn to Cooperate by Monitoring their Neighbors' Satisfaction", In *Proc. of the 15th European Conference on Artificial Intelligence,* 2002, pp. 68-72, which is incorporated herein in its entirety by reference.

Research into the self-sacrifice behavior of living species is currently being conducted at University of Cambridge, where researchers have developed a computer defense system that mimics how bees sacrifice the elves for the greater good of the hive. In this approach, "suicide nodes" defend networks from within. The idea is to give all the devices on a network, or nodes, the ability to destroy themselves, and take down any nearby malevolent devices with them. The self-sacrifice provision provides a defense against malicious nodes attacking clean nodes. The technique, called "suicide revocation," allows a single node to decide if a nearby node's behavior is malevolent, and if so, to shut it down, but at the cost of deactivating itself. Often, at the time an autonomous device receives or generates a self-sacrifice or shut-down signal, it still has good, valuable, and relatively nearby resources or assets that would be destroyed during a self-sacrifice operation.

SUMMARY

The present teachings relate to recovering resources or assets from a self-sacrificing component of an autonomous system, of which resources or assets would otherwise be destroyed during a self-sacrifice operation. As such, a receiving component of the system can benefit from a power provision donated by a self-sacrificing component of the system. Robotic vacuum cleaners have been developed that can seek out power sources when their battery power is low, and even connect themselves to that power source for recharging. Refueling of aircraft in the air is commonplace in military applications, but is limited to fuel rather than recharging and involves a specialized component carrying fuel solely for the purpose of refueling. The present teachings, however, relate to components of an autonomic system, which donate a power provision (battery, fuel, solar panel, or the like) to another component of the autonomic system, to ensure the continued operation of the receiving component, even at the cost of self-sacrifice.

While earlier filed and related U.S. patent application Ser. No. 12/569,422 teaches that elements of a swarm may self-destruct or put themselves in a passive mode in order to ensure the survival of the main part of the swarm, the present teachings also enable elements of the swami to give up their resources, assets, or power provisions to ensure the swarm survives. In an exemplary embodiment, a swarm element is configured to "donate" its power provision to another element of the swarm, for example, prior to a self-destruct operation. Moreover, multiple elements of the swarm may be able to donate their respective power provisions to a key element of the swarm by attaching themselves, for example, either directly or as a daisy chain, to the key element.

According to various embodiments of the present teachings, a method for managing an autonomic system is provided. The autonomic system can comprise a plurality of autonomic components and the method can comprise generating a signal indicative of a triggering event pertaining to one or more faulty autonomic components of a plurality of autonomic components. The method can comprise performing a self-evaluation to determine whether the self-sacrificing component has any salvageable resources available that might benefit another component of the system. If so, the self-sacrificing operation may be postponed, suspended, delayed, or otherwise put-off until the self-sacrificing component has donated the salvageable resources. In the event that one component of an autonomous system is determining whether its salvageable resources can be donated, the component may determine whether the resource is compatible with a different component of the system, for example, with a different component that is within range for a rendezvous. If it is determined that there are no salvageable resources available, or that there is no other system component within range for rendezvous and that is compatible with an available resource, then the self-sacrificing component may carry on with self-sacrifice despite not having been able to donate a useable resource.

The autonomic components of the system can comprise, for example, space exploration vehicles or deep sea exploration vehicles. One or more autonomic components of the system can individually comprise one or more magnetometers, X-ray analyzers, infrared analyzers, mass spectrometers, photodiode-containing detectors, combinations thereof, and the like. The method can comprise undertaking a self-sacrifice operation upon a triggering event such as: an incorrect operation; a determination of likelihood of jeopardizing a primary objective; a failure to perform a self-configuration operation; a failure to perform a self-healing operation; a failure to perform a self-optimizing operation; and a failure to perform a self-protecting operation.

Self-sacrifice can also involve donating a resource or asset to another component of the system, even if the donating component is working perfectly fine, but wherein the donation would enable the receiving component to carry out a more important task or mission for the benefit of the greater system. For example, a more important component of an autonomous system, such as a more important spacecraft, can receive or generate a need for resource signal. The resource needed can be, for example, a power provision. A less important component of the system, such as a less important spacecraft, can then be contacted or interrogated to determine if it has a corresponding resource available. If not, the more important component of the system can continue to search for the needed resource, for example, by contacting or interrogating other less important components of the system. If a less important component of the system does have the needed resource available, then the method can involve self-sacrificing the less important component, at least to the extent that it donates the needed resource, so that the more important component can receive the needed resource. In some cases, the method can involve determining whether the resource available from a less important component is compatible with the more important component. In some cases, the method can involve determining whether the less important component and the more important component are capable of a rendezvous, for example, whether they have compatible docking connections, whether they are in close enough proximity, or whether the risk involved with a rendezvous is too great to be worthwhile.

BRIEF DESCRIPTION OF THE DRAWINGS

The present teachings will be described with reference to the accompanying drawings. The drawings are intended to illustrate, not limit, the present teachings.

FIG. 2 depicts the multi-tier specification model of ASSL (Autonomic System Specification Language) according to various embodiments of the present teachings.

FIG. 3 depicts a partial specification of a self-sacrifice policy according to various embodiments of the present teachings.

FIG. 4 depicts a partial specification of exemplary actions included in a self-sacrifice policy according to various embodiments of the present teachings.

DETAILED DESCRIPTION OF THE PRESENT INVENTION

Figure 1:
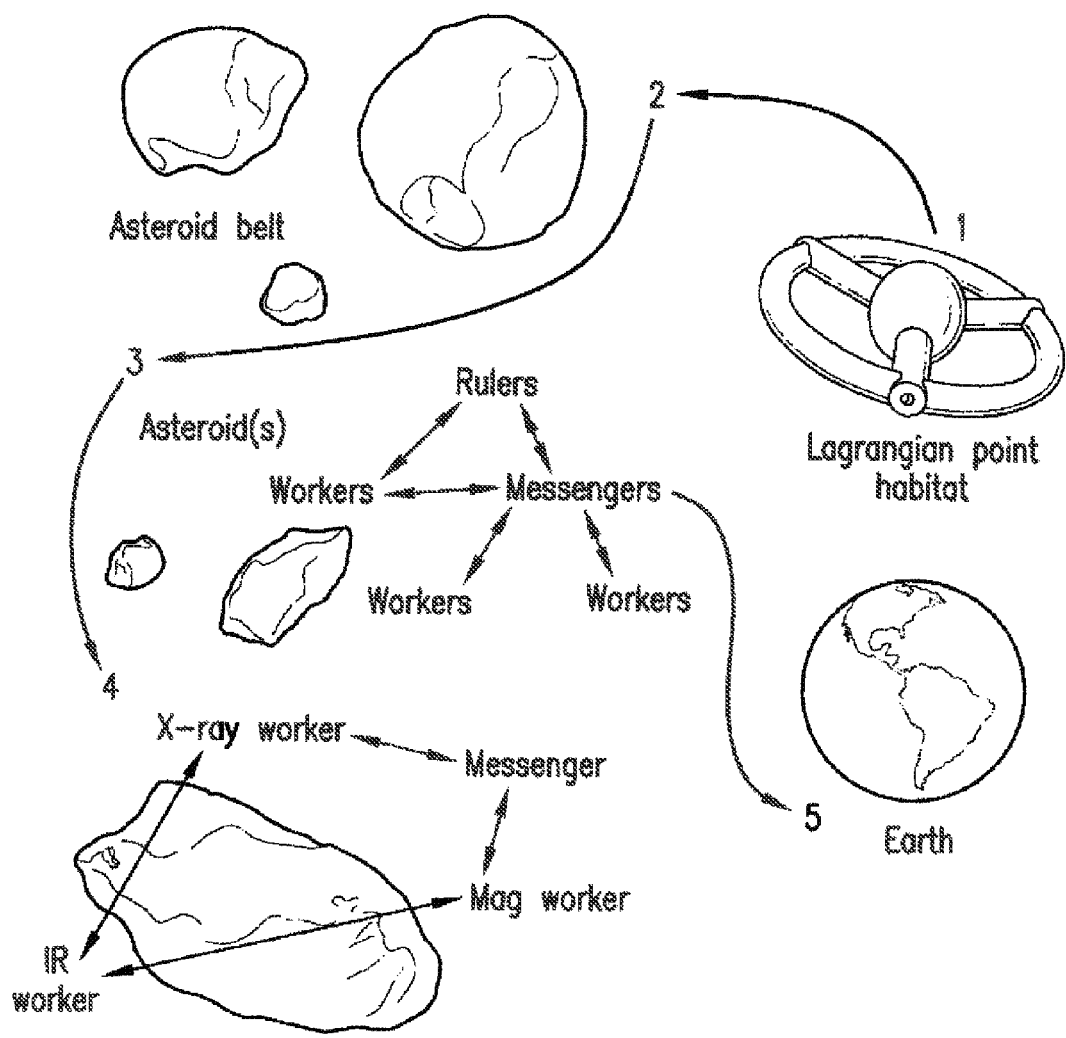
FIG. 1 is a diagram depicting the ANTS concept mission scenario according to various embodiments of the present teachings.

The present teachings enable elements of the system or swarm to give up their resources to ensure the overall system or swarm survives. In an exemplary embodiment, a swarm element is configured to "donate" its power provision, or another resource or asset, to a different element of the system or swarm, for example, prior to a self-destruct operation. Moreover, multiple elements of the swarm may be able to donate their respective power provisions to a key element or to another, more important element of the swarm by attaching themselves to the key element. Attachment can be, for example, directly to the key element, as a daisy chain series attached to the key element, by attaching only the donated power provisions to the power source of the key element, or the like.

Self-sacrifice can comprise, for example, shutting down, self-destruction, or the like. Self-destruction can be, for example, by explosion, by implosion, by steering into an asteroid, planet, sun, or by shuttling off into space. Prior to such self-sacrifice, however, the present teachings provide for the transfer of a resource or asset, for example, a power provision, from the self-sacrificing component to another component of the system that would benefit from receiving the resource or asset.

According to various embodiments of the present teachings, a death-by-default system is used in a multi-agent autonomic system as a means of ensuring the safety and security of the multi-agent autonomic system. The multi-agent autonomic system can comprise a swarm of spacecraft, a plurality of unmanned vehicles, a plurality of unmanned aerial vehicles, a multi-component communications system, a swarm of underwater crafts, a swarm of unmanned underwater crafts, a plurality of robots, a constellation of satellites, or the like. The present teachings also find application in swarm-based exploration missions in space, swarm-based exploration missions underwater, swarm-based exploration missions on a planetary surface, other exploration missions, robotics, robotics in harsh environments that are not easily tended by humans, search-and-rescue management, other emergency management, smart grids, mobile applications, sensor technology, future internet (an internet of things), and the like.

Based on the principle of apoptosis, in which cells in nature are pre-programmed to die unless they receive a chemical reprieve, components in the present systems are pre-programmed to go offline unless a suitable reprieve signal, for example, a digital reprieve signal, is received. The present teachings provide a system wherein, when a component of the autonomic system is exhibiting faulty behavior, the component can be limited in the damage it can cause to the rest of the system, or be limited in the extent of influence it can exert on the rest of the system. The faulty behavior can comprise failing to respond appropriately to requests, being an unnecessary drain on resources, exhibiting signs indicating that the integrity of the component has been compromised, or raising suspicion of being an invalid interloper to the system. Once such faulty behavior is recognized, the component can either be deprived of a reprieve signal on a permanent basis, or on a temporary basis. If temporarily deprived of a reprieve signal, the component can be put in a quiescent mode until it can be verified as a valid component operating as expected, it can be verified as being faulty, or some other remedial action has been taken.

Previous technologies that describe apparatus, systems, methods, and autonomic components that can be used in accordance with the present teachings include the technologies described in U.S. Pat. No. 7,627,538 B2, U.S. Pat. No. 7,899,760 B2, U.S. Pat. No. 7,904,396 B2, U.S. Pat. No. 7,925,600 B2, and U.S. Pat. No. 7,765,171 B2, and in U.S. Patent Application Publication No. US 2010/0146635 A1, each of which is incorporated herein in its entirety by reference. In particular, US 2010/0146635 A1 expands on the teachings of apoptosis and applies them to autonomic self-sacrificing spacecraft. Taking inspiration from nature, whereby certain insects and other organisms (e.g., termites, bees) sacrifice some members of the hive or colony (e.g., worker ants, soldier termites) in order to protect the integrity of the hive, larvae, or the queen, the same self-sacrifice properties are built-into autonomic self-sacrificing spacecraft.

In an example, a swarm of autonomic spacecraft are provided and certain space of the swarm can be sacrificed in order to save other components in the swarm. Sacrifice can be made, for example, by one spacecraft using its solar sails to deflect debris during a solar storm, even though such sacrifice may result in the device being damaged and no longer useable or viable. The sacrificing spacecraft may, however, be left with key instruments, assets, or power provisions that can be used by other members of the swarm or system. In some cases, the self-sacrifice can result in other craft within the swarm, being saved. Similarly, in a coordinated flight of a plurality of unmanned aerial vehicles (UAVs), some of the UAVs may be used to deflect damage to a key device carried by another UAV of the plurality. For example, a self-sacrifice operation can be carried out to protect a particular UAV of the plurality, for example, a UAV carrying a particular piece of equipment or other resource, even if the operation is likely to result in the destruction of the device providing the protection. In effect, a component of the system can put itself in harm's way in order to ensure the greater good of the overall system. In some cases, a component of the system may turn itself off to avoid consuming resources that the system may otherwise use.

According to various embodiments of the present teachings, a vehicle, craft, device, or other component of an autonomic system can be configured to donate its power provision or power source to ensure the continued operation of a different component of the system. The donating component need not be specialized but rather can be a non-specialized component in the system that may be deemed less important than the component receiving the donated power provision. The power provision can comprise a battery, fuel, a fuel cell, a rocket, a rocket booster, a solar panel, a solar sail, a catalyst, a reactant, a reactor, an engine, a motor, a thruster, a drive, a magnet, a combination thereof, or the like.

The donating component can be considered less important and appropriate for donating its power provisions, based on any of a number of criteria, taken alone or in combination. For example, the donating component can be considered less important and/or expendable because it is damaged, because it does not carry a necessary data collection device, because it does not carry a necessary scientific instrument, because it does not carry a necessary optical component, because it is one of a large number of duplicate components, because a mission objective has changed rendering the component useless, because the component receiving the donated power provision is of extremely high importance, because the component receiving the donated power provision is a one-of-a-kind component, because of a combination of these reasons, or the like.

In the context of swarms of spacecraft, swarms of underwater craft, or UAVs, the donating component, the receiving component, or both, can be able to rendezvous, dock, and/or tether with the other component and can be configured to transfer the power provision or connect their power provisions together. In an example, fuel sources can be joined together such that fuel can be transferred from the donating component to the receiving component, or batteries can be connected together such that charge can be transferred from the battery of the donating component to the battery of the receiving component. In some cases, fuel can be transferred from a fuel tank of the donating component directly to the engine of the receiving component, such that the fuel does not have to be transferred to and stored in a fuel tank of the receiving component. Similarly, in some cases, battery charge can be transferred from a battery of the donating component directly to the receiving component, such that the battery does not have to be transferred to and stored by the receiving component and/or such that the battery of the receiving does not receive charge from the battery of the donating component. In some cases, the donating component can attach one or more of its batteries to an unused connector or terminal set on the receiving component.

According to various embodiments, the donating component can stay docked or tethered to the receiving component or can disconnect from the receiving component while leaving its power provision connected to the receiving component. In some cases, the various components of the autonomic system each be provided with one or more empty power provision slots for the purpose of receiving a donated power provision from a self-sacrificing sacrificing component of the system. For example, each can be provided with an empty battery slot or with an empty fuel cell slot and all the components can use the same type of batteries or fuel cells enabling donation from one component of the system to another. In some cases, the donating component, the receiving component, or both, can be provided with a robotic arm, servo-motor system, vacuum system, docking system, or the like, for the purpose of enabling rendezvous of the components, transfer of the power provision, or hook-up to the donated power provision.

According to various embodiments of the present teachings, an autonomic system is provided that comprises a plurality of autonomic components, for example, a coordinating autonomic component and a plurality of autonomic worker components. Each of the autonomic components can be programmed to (i) generate signals indicative of one or more triggering events, (ii) send the signals to the coordinating autonomic component, and (iii) decide to undergo a self-sacrifice procedure based on the occurrence of at least one of the one or more triggering conditions. The coordinating autonomic component can be programmed to assign programmed tasks and issue instructions to each of the plurality of autonomic worker components. Each of the autonomic worker components can comprise one or more resources. Following at least one or more of the triggering conditions, at least one of the autonomic components can donate one or more of its resources to one of the other autonomic components. The triggering event can comprise one or more of: an incorrect operation; a determination of likelihood of jeopardizing a primary objective of a mission; a failure to perform a self-configuration operation; a failure to perform a self-healing operation; a failure to perform a self-optimizing operation; a failure to perform a self-protecting operation; and a need to provide a resource to a more important autonomic component of the system.

In some embodiments, one or more of the autonomic components can be configured to self-sacrifice by self-destruction. At least one of the autonomic components can be configured to self-sacrifice by donating a power provision to another one of the autonomic components. The one or more resources can comprise one or more power provisions, for example, at least one of a fuel cell, a fuel, a rocket, a rocket booster, a solar panel, a solar sail, a catalyst, a reactant, a reactor, an engine, a motor, a thruster, a drive, a magnet, a combination thereof, or the like. In some cases, at least one of the autonomic components comprises a magnetometer, at least one of the autonomic components comprises an X-ray analyzer, and at least one of the autonomic components comprises an infrared analyzer.

According to various embodiments of the present teachings, a method is provided for managing an autonomic system comprising a plurality of autonomic components. The method can comprise generating a signal indicative of a triggering condition pertaining to at least one of the autonomic components of the plurality of autonomic components, and causing the at least one autonomic component to decide to undergo a voluntary self-sacrifice procedure based on the occurrence of the triggering condition. The voluntary self-sacrifice procedure can comprise determining whether any resources are available that could be donated to another autonomic component, donating the available resources to the other autonomic component, and then quiescing or self-destructing. In some cases, the voluntary self-sacrifice operation comprises donating a power provision to another autonomic component. In some cases, the voluntary self-sacrifice operation can comprise determining whether any resource, available for donation, is compatible with the other autonomic component, or whether a resource could be stored, transported, or both, by the second component, even if it is not compatible with the second component.

According to yet other embodiments, the method can involve a voluntary self-sacrifice operation that comprises determining whether it is safe to self-destruct here and now, and if it is not safe to self-destruct here and now, the method can comprise moving to a safe location for self-destruction, and self-destructing at the safe location. The voluntary self-sacrifice procedure can also comprise tethering or docking to another autonomic component and connecting a power provision to the other autonomic component, for example, by plugging in an electrical cable, by removing a battery and inserting it into a battery slot of a receiving component, or the like. Voluntary self-sacrifice can be as simple as a component turning itself off, either temporarily or permanently.

In some embodiments, the method comprises invoking a voluntary self-sacrifice based on one or more of the following triggering conditions: an incorrect operation; a determination of likelihood of jeopardizing a primary objective; a failure to perform a self-configuration operation; a failure to perform a self-healing operation; a failure to perform a self-optimizing operation; a failure to perform a self-protecting operation; and a need to provide a resource to a more important autonomic component of the system. Even if a component is working fine, it may be more important to a mission for the component to self-sacrifice, for example, if needed to provide a resource to a more important autonomic component of the system.

According to various embodiments of the present teachings, an autonomic system is provided that comprises a plurality of autonomic components, comprising a more important autonomic component and a plurality of less important autonomic components. The more important autonomic component can be programmed to (i) generate a need-for-resource signal indicative of a need for one or more resources, and (ii) send the need-for-resource signal to one or more of the less important autonomic components. The less important autonomic components can be programmed to decide to undergo a self-sacrifice procedure based on receipt of the need-for-resource signal from the more important autonomic component. The self-sacrifice procedure can comprise donating one or more resources to the more important autonomic component. The self-sacrifice procedure can further comprise self-destructing after donating one or more resources to the more important autonomic component. The one or more resources can comprise one or more power provisions. The autonomic components can comprise one or ore space exploration vehicles, one or more deep sea exploration vehicles, or the like.

In yet other embodiments of the present teachings, a method is provided for managing an autonomic system comprising a plurality of autonomic components. The method can comprise generating a signal indicative of a need for a resource pertaining to a more important autonomic component of a plurality of autonomic components, and causing at least one less important autonomic component to decide to undergo a voluntary self-sacrifice procedure based on receiving the signal indicative of a need for a resource. The voluntary self-sacrifice procedure can comprise determining whether a needed resource is available that could be donated to the more important autonomic component, and donating the needed resource to the more important autonomic component. The voluntary self-sacrifice operation can comprise donating a power provision to the more important autonomic component. The voluntary self-sacrifice operation can comprise determining whether the resource, available for donation, is compatible with the more important autonomic component. The voluntary self-sacrifice operation can comprise determining whether it is safe to self-destruct here and now, and if it is not safe to self-destruct here and now, moving to a safe location for self-destruction, and self-destructing at the safe location. The voluntary self-sacrifice procedure can comprise tethering or docking to the more important autonomic component and connecting or transferring power provision to the more important autonomic component.

According to various embodiments, a number of initiatives inspired by concepts from biology have arisen for self-management of a complex system. Biological systems, and in particular, the Autonomic Nervous System (ANS), are capable of performing autonomic, innate or in-built, self-regulation activities requiring no conscious thought. In similar fashion, and according to various embodiments of the present teachings, a software system is provided that manages itself. In some embodiments, the system takes advantage of emergent behavior similar to that in social insect colonies. It has been found that emergent behavior helps an insect colony to collectively solve complex problems without centralized control. Thus, colony (or swarm) behavior appears out of local interactions between individuals with simple rule sets and no global knowledge. In fact, emergent behavior does not "help" insect colonies in the general sense of the word, but instead it is the coordinated behavior of the social insects that collectively solves problems. What is emergent in this example is coherence and cooperation from a global point of view, where at the level of the individual nothing actively pushes for it.

According to various embodiments of the present teachings, the self-sacrifice behavior of one or more individual components can be absorbed in serving the usefulness or lives of other individual components. Thus, an emergent behavior is provided wherein the individual components sacrifice themselves to jointly solve a complex problem vital to the entire system or swarm. In some embodiments, an emergent behavior can be provided by the system whereby one or more components of the system self-sacrifices itself for the greater good of the system. In an example, each component can be programmed to identify at least one condition which would cause the respective component to be detrimental to the greater good of the system. The component could also be programmed to self-sacrifice itself if the condition is determined to exist, thereby benefit the entire system. As an illustration, such a time-to-self-sacrifice condition can comprise crossing a risk threshold determined by a risk analysis program. For example, if the continued operation of the component poses a risk of collision with another component of the system, and the risk exceeds a risk threshold, a self-sacrifice operation can be initiated for the greater good of the entire system.

In some cases, the method can comprise causing each of the one or more faulty autonomic components to undertake a voluntary self-sacrifice operation comprising at least one of a transformation operation and a self-destruction operation. In some embodiments, the self-sacrifice can entail transforming to a shield unit, transforming to a messenger autonomic component, transforming to a coordinating autonomic component, or shutting down or turning off a scientific instrument. The one or more faulty autonomic components can comprise a plurality of faulty autonomic components or just a single faulty autonomic component. Self-sacrifice can also involve donating a resource or asset to another component of the system, even if the donating component is working perfectly fine, but wherein the donation would enable the receiving component to carry out a more important task or mission for the benefit of the greater system.

According to various embodiments of the present teachings, an autonomic system is provided that comprises a plurality of autonomic components, for example, a coordinating autonomic component, a messenger autonomic component, and a plurality of autonomic worker components. Each autonomic component of the plurality of autonomic components can be individually programmed to (i) generate signals indicative of one or more triggering events, (ii) send the signals to one or more of the other autonomic components, and (iii) self-sacrifice voluntarily based on the occurrence of a triggering event. In an exemplary embodiment, the plurality of autonomic components can comprise a coordinating autonomic component that is programmed to assign programmed tasks and issue instructions to each of a plurality of autonomic worker components. In some embodiments, the system can comprise a messenger autonomic component that is configured to facilitate communication between a coordinating autonomic component and one or more autonomic worker components. Each of the autonomic worker components can comprise one or more scientific instruments and can be configured to operate the respective one or more scientific instruments. At least one of the autonomic components of the system can be configured to self-sacrifice voluntarily by transformation or self-destruction upon occurrence of a triggering event.

In some embodiments, the triggering event that can lead to self-sacrifice can comprise one or more of: an incorrect operation; a determination of likelihood of jeopardizing a primary objective; a failure to perform a self-configuration operation; a failure to perform a self-healing operation; a failure to perform a self-optimizing operation; a failure to perform a self-protecting operation, and the like. The self-sacrifice can comprise a transformation operation, for example, a transformation of an autonomic component to a shield unit. In some embodiments, self-sacrifice can comprise a transformation to a different type of autonomic component, for example, from an autonomic worker component to a messenger autonomic component, or a transformation from an autonomic worker component to a coordinating autonomic component. Self-sacrifice can occur by other means as well, for example, self-sacrifice can comprise shutting down or turning off a scientific instrument.

In some embodiments, the autonomic system can comprise one or more deep sea exploration vehicles or space exploration vehicles, for example, a plurality of different vehicles. Each vehicle can have one or more scientific instruments on-board and redundancies can be built into the system such that two or more of the vehicles can have the same type of instrument on-board. For example, at least one of the autonomic components can comprise a magnetometer, at least one of the autonomic worker components can comprise an X-ray analyzer, and at least one of the autonomic worker components can comprise an infrared analyzer.

According to various embodiments of the present teachings, an autonomic nano technology swarm (ANTS) system is provided. With the ANTS system, a swarm of small autonomous exploration vehicles, such as spacecraft, can be used for an exploration mission, thus reducing the costs and risks involved when only a single, larger spacecraft is used. The system further enables exploration missions where a single, large, spacecraft would be impractical, and can offer greater redundancy and increased mission longevity in harsh environments. The ANTS system can exhibit all of the features of a multi-agent autonomic system (AS) wherein the spacecraft, vehicles, or system components themselves are autonomic elements (AEs).

According to various embodiments, the software architecture is adaptive in all its attributes and functionality, including its performance, security, fault tolerance, configurability, and the like. Moreover, the system can make decisions to cope with new environmental conditions encountered, and can learn and evolve to become better adapted to what it is supposed to do. Thus, a spacecraft unit can be programmed such that its own self-sacrifice can be used to protect other components or units vital to the system, or programmed to self-sacrifice if the result would be a significant performance gain for the entire system or mission.

In some embodiments, the emergent behavior is a complex behavior derived spontaneously from simple rules. Thus, the emergent behavior can enable the production of a high-level, more complex behavior through the interaction of multiple system components, by following simple rules.

The self-sacrifice behavior described herein differs from the other approaches mentioned above in at least the following ways. Firstly, in some embodiments, "death" is not always assumed for the individual component. Secondly, in some embodiments, self-sacrifice can comprise making a choice of leaving a critical task to another individual component when the individual's own performance is not optimal. These and other advantages are apparent from the present teachings.

According to various embodiments, an autonomic element in a system comprising numerous autonomic elements can exhibit or be programmed to exhibit self-adapting behavior to improve performance and/or to protect vital parts of the system. According to some embodiments, an autonomic element can comprise a spacecraft in an autonomous space mission. According to some embodiments, the spacecraft can comprise an autonomous worker vehicle or component in an autonomous space mission which mission involves using a plurality of different spacecrafts. According to some embodiments, the autonomous space mission can be performed by an ANTS system as described above. According to some embodiments, each spacecraft in the ANTS system can have a specialized mission. According to some embodiments, individual components, such as spacecraft or units in the ANTS system, can be programmed to exhibit emergent self-adapting behavior. An individual spacecraft unit of the system can perform self-sacrifice as part of its self-adapting behavior, in order to improve the system performance and/or to protect vital parts of the system, for example, based on goals of an exploration mission.

According to various embodiments, the system uses Autonomic System Specification Language (ASSL). The ASSL can be used to model the self-sacrifice behavior of the individual spacecraft units. The ASSL can follow simple pre-defined rules, but can help in the formation of an emergent complex system-level behavior that strives to protect and optimize the system as a whole. It should be understood that by self-sacrifice, "death" is not the only option under consideration for the spacecraft, but rather, in some embodiments another option for self-sacrifice can comprise a voluntary relinquishment from the "social status" of the spacecraft in the swarm. According to some embodiments, the voluntary relinquishment from the "social status" can be achieved by delegating rights from one component to another, for example, from one spacecraft to another spacecraft of the system.

The systems, clients, servers, methods, computer-readable media, software, hardware, and operating environments that can be used include those described in U.S. Patent Applications Publications Nos. US 2007/0073631 A1, entitled "Systems, Methods and Apparatus for Quiescence of Autonomic Systems," and US 2007/0260570 A1, entitled "Systems, Methods and Apparatus for Autonomic Safety Devices," which are incorporated herein in their entireties, by reference.

ANTS Structure

According to various embodiments of the present teachings, an ANTS system is provided for use in a sub-mission Prospecting Asteroids Mission (PAM). The PAM can provide a novel approach to asteroid belt resource exploration. ANTS can provide extremely high autonomy, minimal communication requirements to Earth, and a set of very small explorers with few consumables. In some embodiments, the explorers forming the swarm can be pico-class, low-power, and low-weight spacecraft units, yet capable of operating as fully autonomous and adaptable agents.

FIG. 1 depicts a PAM sub-mission scenario of the ANTS concept mission, according to various embodiments of the present teachings. As depicted in FIG. 1, a transport spacecraft launched from Earth toward an asteroid belt can carry a laboratory that assembles tiny spacecraft. Once the transport spacecraft reaches a certain point in space where gravitational forces are balanced, termed a Lagrangian, and in this case the L1 Lagrangian point, the transport ship can release the assembled swarm, which can head toward the asteroid belt. Each spacecraft can be equipped with a solar sail and thereby can rely primarily on power from the sun, using, for example, tiny thrusters to navigate independently.

As FIG. 1 shows, there can be at least three classes of spacecraft: coordinating autonomic components (rulers); messenger autonomic components (messengers); and autonomic worker components (workers). By grouping them in appropriate ways, the ANTS system can form teams that explore particular asteroids of the asteroid belt. Hence, the ANTS system can exhibit self-organization since there is no external force directing its behavior and no single spacecraft having a global view of the intended macroscopic behavior. According to some embodiments, the internal organization of the swarm can depend on the global task to be performed and on the current environmental conditions. According to some embodiments, the swarm can consist of several sub-swarms, which can be temporal groups organized to perform a particular task. According to some embodiments, each sub-swarm can have a coordinating group leader (ruler), one or more messengers, and a number of workers each carrying at least one specialized instrument. According to some embodiments, the messengers can connect or provide communications between the team members when such team members cannot connect directly to one another.

Self-Sacrifice Scenarios in ANTS

According to various embodiments, the system can implement self-optimization. In general, the global system optimization can be correlated to the optimization of the individual system elements. Each component of the system can improve its performance on-the-fly. For example, in some embodiments rulers can use experience gained to self-optimize. As an example, rulers can use their experience to improve their ability to identify asteroids. In some embodiments, messengers can strive to find the best position to improve communication among the other components or swarm units. According to some embodiments, workers can self-optimize through learning and experience.

Single components can "die" for the good of the entire system or otherwise self-sacrifice, for example, by voluntarily relinquishing their posts. In some embodiments, a spacecraft unit can, for example, voluntarily relinquish its post as an ANTS worker component by delegating tasks to other worker components. While scenarios related to self-sacrifice of ANTS workers are described in great detail herein, it is to be understood that other classes of spacecraft, for example, rulers and/or messengers, can also be configured to self-sacrifice voluntarily.

According to various embodiments, a worker can "die" or sacrifice itself voluntarily. For example, a worker can sacrifice itself voluntarily when the worker cannot continue performing its duties as a worker. As an illustration, a worker can self-sacrifice if it cannot continue to support the service-level objectives assigned to it (for example, if it cannot achieve performance). While operating in space, for example, an instrument of a worker can be damaged but not destroyed. For example, the instrument may still be operational, but its performance might be degraded or destroyed. According to some embodiments, a worker with a destroyed or heavily damaged instrument that performs below a performance minimum, can self-sacrifice voluntarily.

According to some embodiments, the self-sacrifice can comprise a transformation, for example, a transformation of a worker. If a worker cannot perform its duties anymore, due to a damage or instrument loss, the worker can, according to various embodiments, perform one or more operations. The operations can comprise, for example, asking the ruler to assign a new replacement worker, and/or striving to transform into another category of component useful to the swarm unit. Such transformation can comprise, for example, transforming from a worker to a messenger, from a messenger to a worker, from a worker to a ruler, or the like. According to some embodiments, a worker can try to transform to a ruler or a messenger, but if it is not possible for the worker to transform to a ruler or messenger, the worker can instead transform to a shield component such as a stand-by shield. According to some embodiments, such a shield component can sail nearby and strive to protect the replacement worker from different hazards. For example, a shield unit can, according to some embodiments, take the impact of an incoming small asteroid which is about to hit the replacement worker. The shield unit does not have to spend additional time and resources to recover from this probable impact. This kind of protection can comprise a complete self-sacrifice because the shield unit can serve as such until its full destruction, while increasing the overall performance of the system.

According to various embodiments, the self-sacrifice operation can comprise a self-destruction operation. According to some embodiments, when a worker is damaged so badly that it cannot move anymore, the worker can self-destruct, for example, by exploding. This can be used to avoid the risk of collision with another component of the system. Hence, there can be a real self-sacrifice that indirectly leads to higher system performance, due to the reduction in the risk of an impact.

According to various embodiments, the self-sacrifice behavior of a single component, such as a spacecraft unit in an ANTS system, can be modeled with Autonomic System Specification Language (ASSL). With ASSL, validation and code generation of the specified ASs can be achieved. According to various embodiments, the ASSL can be defined through formalization tiers. According to some embodiments, over the formalization tiers, ASSL can provide a multi-tier specification model that is designed to be scalable and to expose a judicious selection and configuration of infrastructure elements and mechanisms needed by an AS. ASSL can define an AS with interaction protocols and AEs, where the ASSL tiers and their sub-tiers describe different aspects of the AS under consideration, like policies, communication interfaces, execution semantics, actions, and the like.

According to various embodiments, the ASSL tiers and their sub-tiers, as shown in FIG. 2, can be abstractions of different aspects of the autonomic system under consideration. According to some embodiments, the AS Tier can specify an AS in terms of service-level objectives (AS SLO), self-management policies, architecture topology, actions, events, and metrics. According to some embodiments, the AS SLO can be a high-level form of behavioral specification that establishes system objectives such as performance. According to some embodiments, the self-management policies of an AS can include: 1) self-configuring; 2) self-healing; 3) self-optimizing; and 4) self-protecting (also referred to herein as a self-CHOP of an AS). Other self-management policies can also or instead be included. According to some embodiments, the metrics can constitute a set of parameters and observables controllable by the AEs.

According to various embodiments, at the AS Interaction Protocol tier, the ASSL framework can specify an AS-level interaction protocol (ASIP). According to some embodiments, ASIP can be a public communication interface, expressed as communication channels, communication functions, and messages.

According to various embodiments, at the AE Tier, the ASSL formal model considers AEs to be analogous to software agents able to manage their own behavior and their relationships with other AEs. According to some embodiments, at the AE Tier, ASSL can describe the individual AEs.

According to various embodiments, a worker's self-sacrifice behavior can be modeled with ASSL. It should be understood that the model presented and described herein is exemplary only.

According to various embodiments, the self-sacrifice behavior can comprise a self-management policy, which can be specified at the individual component or spacecraft level (at the AE Tier). FIG. 2 presents a partial specification of a self-sacrifice policy that can be used according to various embodiments based on the scenarios described herein. FIG. 2 describes possible choices a worker can make when the worker is no longer minimally or fully operational. According to various embodiments, the definitions that follow can be used to specify exemplary the self-sacrifice policies.

Self-sacrifice can be defined as a self-management policy structure. A set of fluents and mappings can be used to specify this policy. With fluents, specific situations can be expressed, in which the policy is interested. With mappings, the situations can be mapped to actions.

Actions can be defined as a set of actions that can be undertaken by the worker in response to certain conditions, and according to that policy, as shown in FIG. 3.

Events can be defined as a set of events that initiate fluents and can optionally be prompted by actions according to that policy.

Metrics can be defined as a set of metrics needed by that policy.

According to various embodiments, the unableToExplore fluent, shown in FIG. 2, can take place when the worker is no longer operational, due to, for example, heavy damage or instrument loss. The fluent can be initiated by an instrIsNonfunctional event and can terminate if one of the events canBeRuler, canBeMessenger, canBeShield, or mustBeDestroyed occurs. In some embodiments, this fluent can be mapped to a checkTransformation action that checks for a possible worker transformation and triggers one of the triggering events that terminate the current fluent. According to some embodiments, each of the terminating events can initiate a new fluent respectively. According to some embodiments, the "transform" fluents, shown in FIG. 2, can be mapped to "transformTo" actions, exemplary portions of which are presented in FIG. 3. The mapping can transform the worker into a ruler, a messenger, or a shield, according to the example shown. As specified, the transformation attempts can be hierarchically related. Thus, when possible, the transformation process can start with a transformation into a ruler or into a messenger, and then, in case of failure, the algorithm can attempt to perform a transformation into a shield. According to some embodiments, at the end of the hierarchically ordered transformations, self-destruction of the worker can be performed, in case none of the transformations is successful. A self-destruction device can be included in or on the component, for example, an explosive charge and appropriate detonation circuitry mounted in a spacecraft.

According to various embodiments, ASSL can allow specification of systems evolving over time. According to some embodiments, the evolution of such systems can take place in the actions of the system. According to some embodiments, via a finite set of change, remove, add, and create statements, the actions of the system can prompt changes in the tiers and sub-tiers of the AS under consideration.

FIG. 4 presents a partial specification of some of the actions which can be needed by the self-sacrifice policy. It should be understood that, the "transformTo" actions can change the service-level objectives (SLO) of the worker under consideration. According to some embodiments, these actions can be used to re-specify the component or unit in accordance with the new SLO. According to some embodiments, the transformToShield action can first remove the old worker SLO specifications and next create the new shield SLO, as shown in FIG. 3, thus avoiding contradictions between both worker and shield SLO. It should be understood that while the add statements in FIG. 3 are only partially their use in a more complex algorithm would be apparent to those skilled in the art given the present teachings.

According to some embodiments, the transformToShield action can turn off the other worker's self-management policies to avoid contradictions between both worker and shield SLO. According to some embodiments, the transformToShield action can turn off the other worker's self-management policies via four change statements, which set the SWITCH flag of the self-management policies to OFF.

In some embodiments, the physical transformation can be accomplished by the IMPL routine doShieldTransformation. The IMPL clause states "for further implementation". This means that the ASSL framework will generate doShieldTransformation as an empty routine for manual implementation.

Donation of Power Provision

Figure 5:
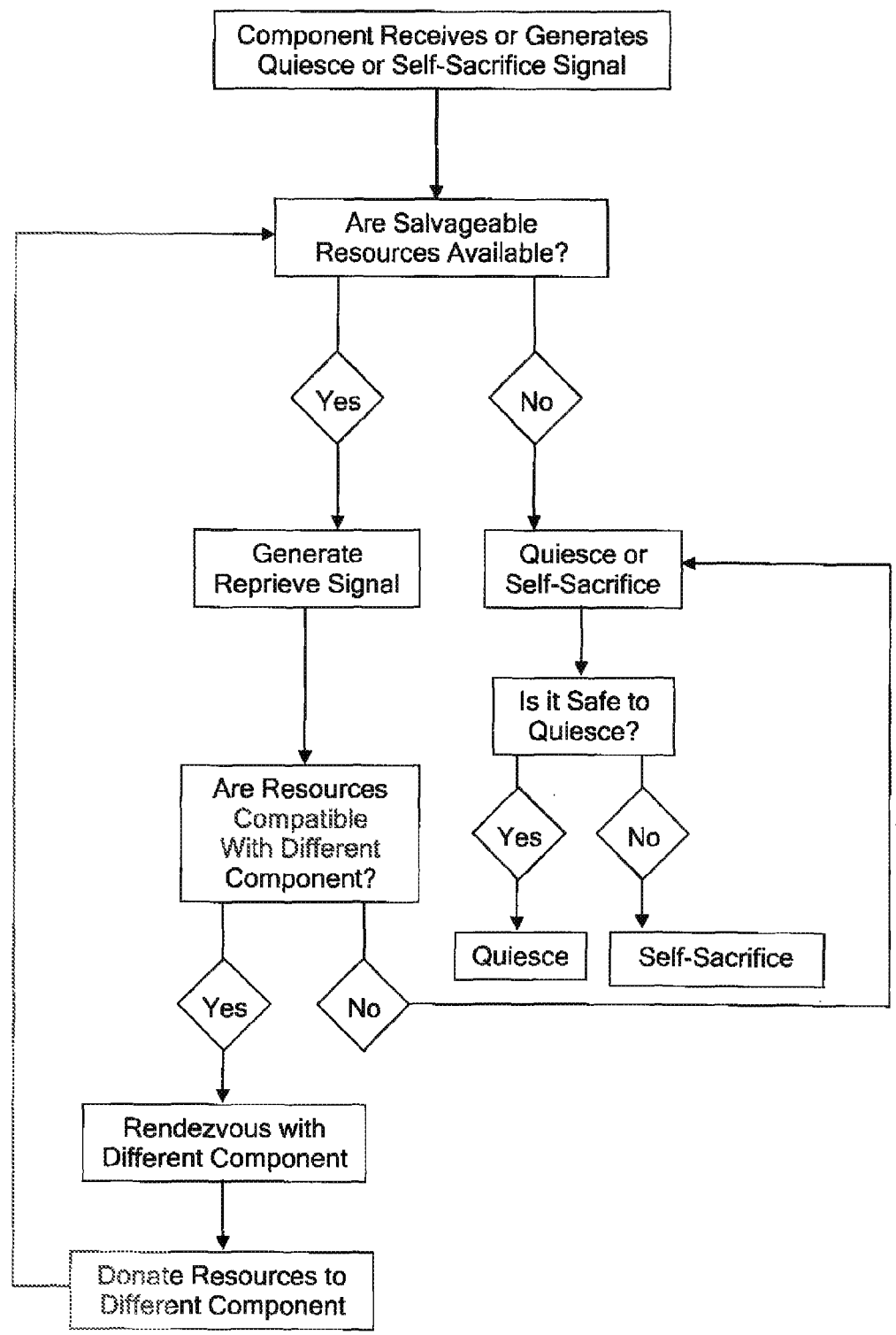
FIG. 5 is a flow chart showing various steps involved with an exemplary method of the present teachings, wherein a component of an autonomous system, which has received or generated a quiesce or self-sacrifice command, is evaluated to determine whether the component has resources that can be donated to one or more other components of the system, before the quiesce or self-sacrifice function is carried out.

FIG. 5 is a flow chart showing various steps involved with an exemplary method of the present teachings, wherein a component of an autonomous system, which has received or generated a quiesce or self-sacrifice command, is evaluated to determine whether the component has resources that can be donated, or salvaged and donated, to one or more other components of the system. If there are such available resources, then other conditions can be taken into consideration and other actions may be taken before the quiesce or self-sacrifice function is carried out. The resources can be fuel, a fuel cell, a battery, battery power, a solar panel, other power provisions, a scientific instrument, an optical component, a mechanical component, a reactor, a combination thereof, or the like. If one or more such resources are available, then the method can comprise generating a reprieve signal to delay the quiesce or self-sacrifice of the component. The method can comprise making a determination as to whether the one or more resources available are compatible with another component of the system, that is, a potential receiving component. The method can involve looking up data or comparing data to a look-up table, accessing a parts list stored in a memory device in or on the donating component, asking for and/or receiving information by electromagnetic transmission, or the like. If the one or more resources are compatible, then a determination can be made as to whether the component is capable, for example, in close enough physical proximity, to rendezvous with the receiving component. If so, the one or more resources can be transferred, moved, re-located, or the like, from the donating component to the receiving component. The donating component, the receiving component, or both, can be autonomous and both can be part of the same autonomic system. Time delay in making all the determinations and calculations, and time delay in carrying out the donation, can be considered and the risk associated with that time delay can be determinative of whether to pursue such a course of action.

If a donation is completed, the donating component can then determine whether there are one or more other salvageable resources available. For example, the donating component may have had a rendezvous with a receiving component of the system and donated all resources compatible with the receiving component, for example, that might benefit the receiving component or that the receiving component might hold onto and eventually pass along to yet another component of the system. If, after the transfer of all compatible resources to the receiving component, the donating component still has other resources that might be compatible with yet other components of the system, then the method can involve maintaining or renewing the reprieve signal. Further calculations and/or determinations can be made, depending on risk, as to whether the donating component may proceed to carry out one or more additional donations until all resources available for donation have been donated or are exhausted. If the risk of doing harm and the harm to the system are determined to outweigh to benefits that would be achieved by another donation, then the method can involve proceeding to a quiesce or self-sacrifice procedure.

In some cases, for example, a component can quiesce for long periods of time, even years, if quiescence would not harm the system. In some cases, the component can remain in quiescence whether or not resources to be donated are available. If it is determined that it is safe to quiesce, the component can quiesce. If it is determined that it is not safe to quiesce, then the component can self-sacrifice or self-destruct.

As can be seen in FIG. 5, if it is determined that no salvageable resources are available, then the component having received the quiesce or self-sacrifice signal, proceeds to a quiesce or self-sacrifice procedure. The procedure can entail making a determination as to whether it is safe to quiesce or self-sacrifice. As can further be seen in FIG. 5, if the one or more resources are not compatible with any other components of the system, the reprieve signal can be withdrawn and the component can proceed with quiescence or self-sacrifice. Self-sacrifice can involve self-destruction and self-destruction can involve determining whether it is safe to self-destruct here and now. If it is not safe to self-destruct here and now, then the component can move to a safe location for self-destruction, and then self-destruct.

Figure 6:
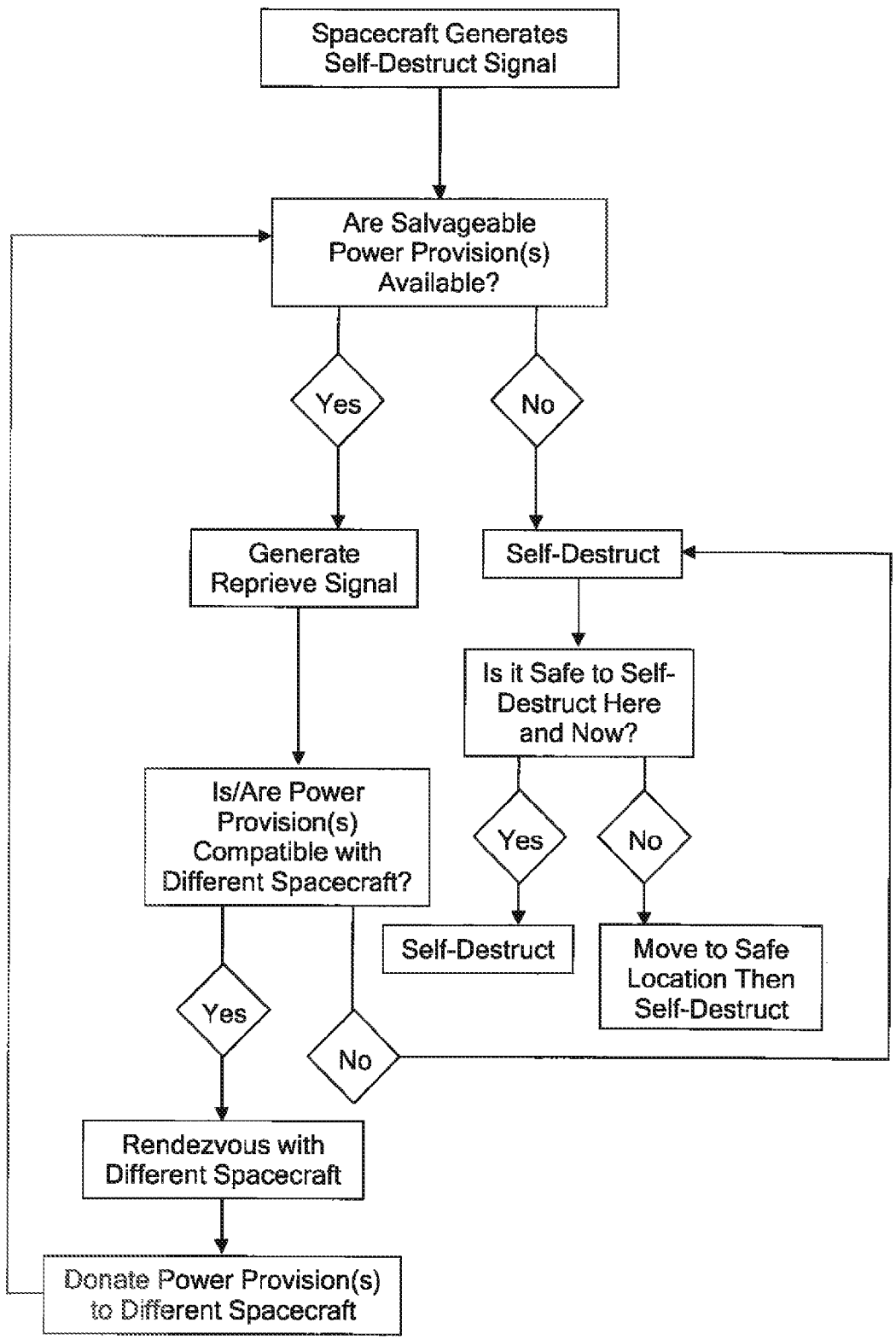
FIG. 6 is a flow chart showing various steps involved with another exemplary method of the present teachings, wherein, once a first spacecraft generates a self-destruct command it is evaluated to determine whether it has a salvageable power provision that can be donated to a second spacecraft before the first spacecraft self-destructs.

FIG. 6 is a flow chart showing various steps involved with yet another exemplary embodiment of the present teachings, wherein a first spacecraft that has received or generated a self-destruct command is evaluated to determine whether it has a power provision that can be donated to a second spacecraft before self-destruction. If such a power provision is available, then the method can comprise generating a reprieve signal to delay the self-destruction of the component. The power provision can comprise a fuel, a fuel cell, a battery, battery power, a solar panel, a reactor, any other power provision, a combination thereof, or the like. The method can comprise making a determination as to whether the one or more resources available are compatible with another spacecraft of the system, that is, a potential receiving spacecraft.

The method can involve looking up data or comparing data to a look-up table, accessing a parts list stored in a memory device in or on the donating component, asking for and/or receiving information by electromagnetic transmission, or the like. If the one or more power provisions are compatible, then a determination can be made as to whether the donating spacecraft is capable of a rendezvous with the second spacecraft, for example, in close enough physical proximity. If so, the one or more power provisions can be transferred, moved, re-located, or the like, from the donating spacecraft to the receiving spacecraft. The donating spacecraft, the receiving spacecraft, or both, can be autonomous and both can be part of the same autonomic system.

Time delay in making all the determinations and calculations, and time delay in carrying out the donation, can be considered and the risk associated with that time delay can be determinative of whether o pursue such a course of action. If a donation is completed, the donating spacecraft can then determine whether there are one or more other salvageable power provisions available. For example, the donating spacecraft may have had a rendezvous with a receiving spacecraft of the system and donated fuel cell power provisions compatible with the receiving spacecraft, but the salvageable batteries of the donating spacecraft might not be compatible with the receiving spacecraft. If, after the transfer of all compatible power provisions to the receiving spacecraft, the donating component still has other power provisions that might be compatible with yet another spacecraft of the system, then the method can involve maintaining or renewing the reprieve signal. Further calculations and/or determinations can be made, depending on risk, as to whether the donating spacecraft may proceed to carry out one or more additional donations until all power provisions available for donation have been donated or are exhausted, or until the risk of doing harm and the harm to the system are determined to outweigh to benefits that would be achieved if another donation were to occur.

As can be seen in FIG. 6, if it is determined that no salvageable power provisions are available, then the spacecraft that received the self-destruct signal proceeds to a self-destruct procedure. As can further be seen in FIG. 6, if the one or more power provisions are not compatible with any other spacecraft of the system, the reprieve signal can be withdrawn and the spacecraft can proceed with self-destruction. Self-destruction can involve determining whether it is safe to self-destruct here and now. If it is not safe to self-destruct here and now, then the component can move to a safe location for self-destruction, and then self-destruct.

Figure 7:
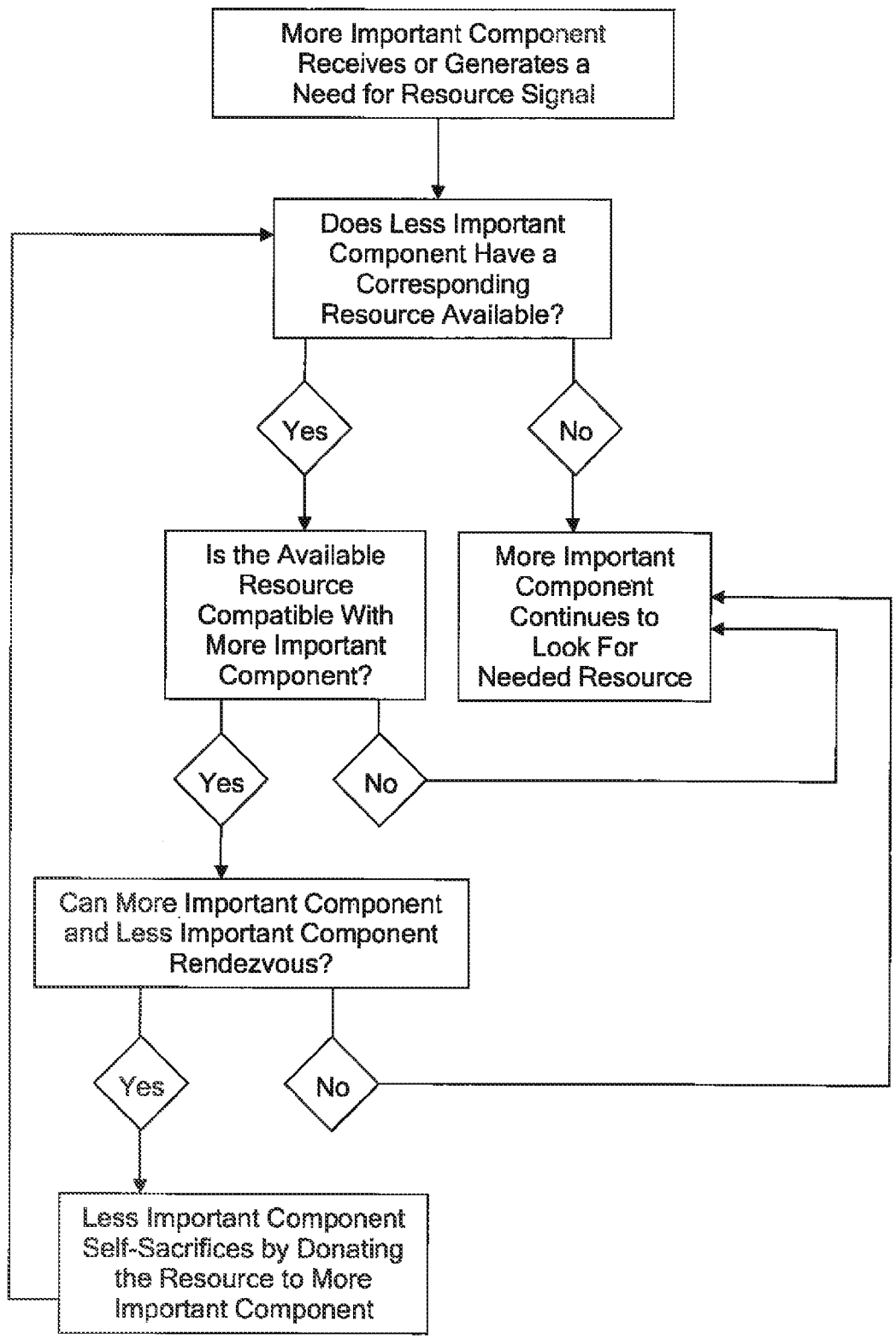
FIG. 7 is a flow chart showing various steps involved with an exemplary method of the present teachings, wherein a more important component of an autonomous system has received or generated a need for resource signal, and a less important component is evaluated to determine whether the less important component can be self-sacrificed to donate a needed resource to the more important component of the system.
Figure 8:
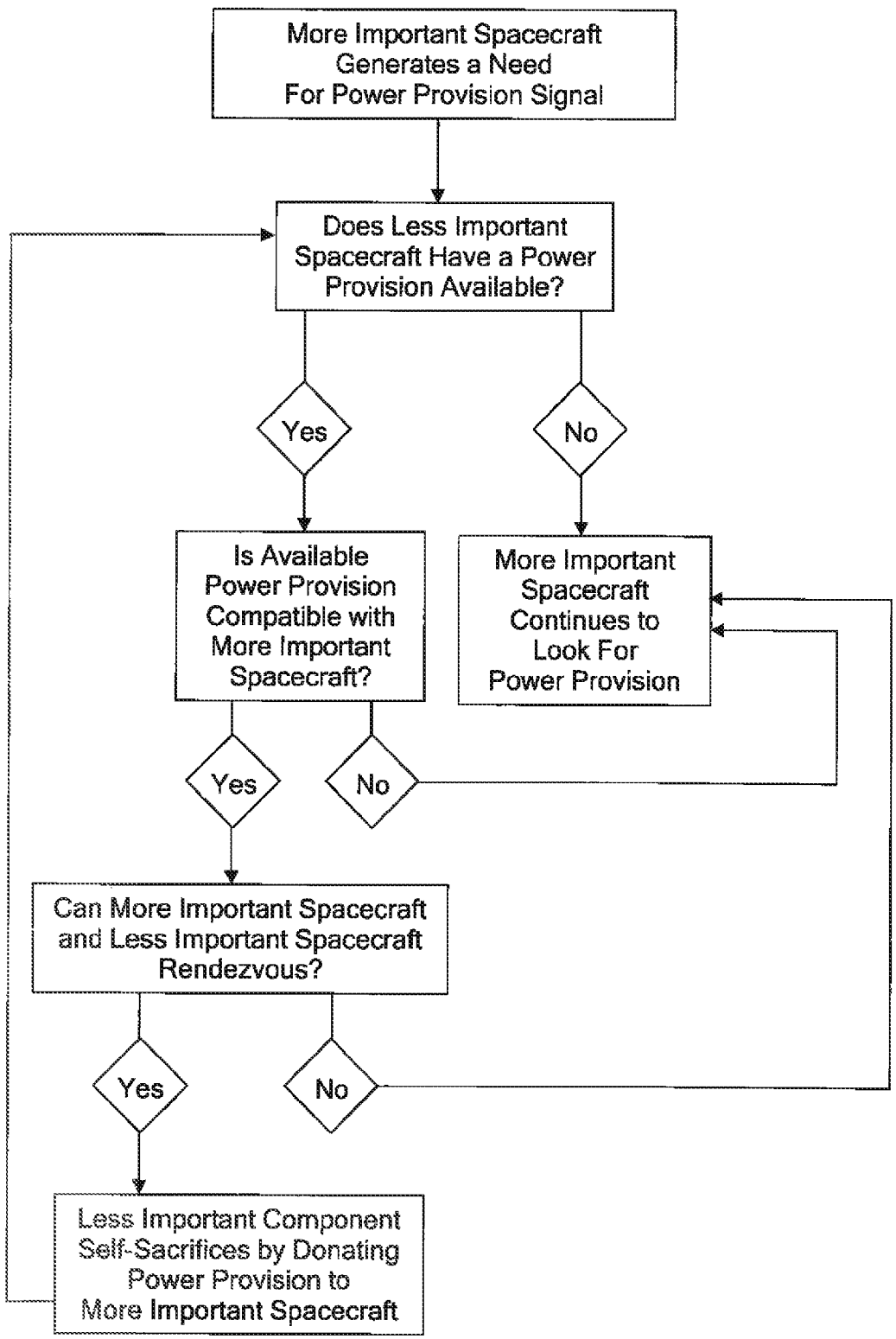
FIG. 8 is a flow chart showing various steps involved with another exemplary method of the present teachings, wherein a more important spacecraft of an autonomous system generates a need for a power provision signal, and a less important spacecraft of the autonomous system is evaluated to determine whether it can be self-sacrificed to donate a power provision and fill the need of the more important a spacecraft.

As exemplified in FIGS. 7 and 8, self-sacrifice can also involve donating a resource or asset to another component of the system, even if the donating component is working perfectly fine, but wherein the donation would enable the receiving component to carry out a more important task or mission for the benefit of the greater system. FIG. 7 is a flow chart showing various steps involved with such a method, wherein a more important component of an autonomous system has received or generated a need for resource signal, and a less important component is evaluated to determine whether the less important component can be self-sacrificed to donate a needed resource to the more important component of the system. For example, a more important component of an autonomous system, such as a more important spacecraft, can receive or generate a need for resource signal. The resource needed can include, but need not be limited to, a power provision. A less important component of the system, such as a less important spacecraft, can then be contacted or interrogated to determine if it has a corresponding resource available. If not, the more important component of the system can continue to search for the needed resource, for example, by contacting or interrogating other less important components of the system.

As shown in FIG. 7, if a less important component of the system does have the needed resource available, then the method can involve self-sacrificing the less important component, at least to the extent that it donates the needed resource, so that the more important component can receive the needed resource. If the less important component is to be self-sacrificed, the method can determine if there are other resources that can also be donated along with the needed resource. If other resources are available to be donated by the less important component, the method can involve weighing the benefits and detriments of the more important component taking on the additional, not needed, resources. If the less important, self-sacrificing component has no resources available for donation besides the needed resource, then the less important component may permanently shut down, jettison off into space, or self-destruct, for example, by activating an explosive charge or by steering itself or being pushed into a planet, sun, moon, asteroid, or other body.

In some cases, the method can involve determining whether the resource available from a less important component is compatible with the more important component. In some cases, the method can involve determining whether the less important component and the more important component are capable of a rendezvous, for example, whether they have compatible docking connections, whether they are in close enough proximity, or whether the risk involved with a rendezvous is too great to be worthwhile. In some cases, the docking compatibility, resource compatibility, or both, can be determined before the method proceeds to determine whether the less important component has the needed resource, because if the two components are not capable of a rendezvous with one another, then it may be immaterial whether the less important component has the needed resource.

FIG. 8 is a flow chart showing various steps involved with another exemplary method of the present teachings, wherein a more important spacecraft of an autonomous system generates a need for a power provision signal, and a less important spacecraft of the autonomous system is evaluated to determine whether it can be self-sacrificed to donate a power provision and fill the need of the more important a spacecraft. Similar to the method depicted in FIG. 7, the method depicted in FIG. 8 involve donating a resource or asset to another component of the system, her, a power provision, even if the donating spacecraft is working perfectly fine. The result is that the donation enables the receiving, more important spacecraft, to carry out a more important task or mission for the benefit of the greater autonomous system, even at the cost of losing a perfectly good, but less important, spacecraft. The method can involve contacting or interrogating a less important spacecraft to determine if it has a power provisions available. If not, the more important spacecraft can continue to search for the needed power provision, for example, by contacting or interrogating other less important spacecraft of the autonomous system.

As shown in FIG. 8, if a less important spacecraft does have the needed power provision, then the method can involve self-sacrificing the less important spacecraft, at least to the extent that it donates the needed power provision, so that the more important component can receive the needed power provision. If the less important spacecraft is to be self-sacrificed, the method can also determine whether there are any other resources that can also be donated along with the needed power provision. If other resources are available to be donated by the less important spacecraft, the method can involve weighing the benefits and detriments of having the more important spacecraft take on the additional, not needed, resources. In some cases, other resources may need to be tested to determine whether they in good working order, damaged, or not responding. If the less important, self-sacrificing spacecraft has no other resources available for donation besides the needed power provision, then the less important component may permanently shut down, jettison off into space, or self-destruct, for example, by activating an explosive charge or by steering itself or being pushed into a planet, sun, moon, asteroid, or other body.

In some cases, the method can involve determining whether the power provision available from a less important spacecraft is compatible with the more important spacecraft. In some cases, the method can involve determining whether the less important spacecraft and the more important spacecraft are capable of a rendezvous, for example, whether they have compatible docking connections, whether they are in close enough proximity to one another, or whether the risk involved with a rendezvous is too great to be worthwhile. In some cases, the docking compatibility, resource compatibility, or both, can be determined before the method proceeds to determine whether the less important component has the needed power provision, because if the two components are not capable of a rendezvous with one another, then it may be immaterial whether the less important component has the needed resource.

While spacecraft have been exemplified herein as the system components, it is to be understood that other systems and components are also within the scope and spirit of the present teachings. The multi-agent autonomic system described herein can comprise a swarm of spacecraft, a plurality of unmanned vehicles, a plurality of unmanned aerial vehicles, a multi-component communications system, a swarm of underwater crafts, a swarm of unmanned underwater crafts, a plurality of robots, a constellation of satellites, or the like, and all of these systems should be considered to be within the realm of the present teachings.

Other embodiments of the present invention will be apparent to those skilled in the art from consideration of the present specification and practice of the present invention disclosed herein. It is intended that the present specification and examples be considered as exemplary only with the true scope and spirit of the invention being indicated by the following claims and equivalents thereof.

What is claimed is:

1. An autonomic system, the autonomic system comprising:
    a plurality of autonomic components, the plurality of autonomic components comprising a coordinating autonomic component and a plurality of autonomic worker components, each autonomic component of the plurality of autonomic components being programmed to (i) generate signals indicative of one or more triggering events, (ii) send the signals to the coordinating autonomic component, and (iii) decide to undergo a self-sacrifice procedure based on the occurrence of at least one of the one or more triggering conditions,
    wherein the coordinating autonomic component is programmed to assign programmed tasks and issue instructions to each of the plurality of autonomic worker components, each of the autonomic worker components comprises one or more resources, and, following at least one or more triggering conditions, at least one of the autonomic components of the plurality of autonomic components donates one or more of its resources to one of the other autonomic components of the plurality of autonomic components, wherein the one or more triggering events comprises one or more of:

an incorrect operation;

a determination of likelihood of jeopardizing a primary objective;

a failure to perform a self-configuration operation;

a failure to perform a self-healing operation;

a failure to perform a self-optimizing operation;

a failure to perform a self-protecting operation;

a failure to perform another self-operation; and a need to provide a resource to a more important autonomic component of the system, wherein an autonomic component is more important for being at least one of a necessary data collection device, a carrier of a scientific instrument, a carrier of an optical component, a unique component, or the like.

2. The autonomic system of claim 1, wherein at least one of the autonomic worker components is configured to self-sacrifice by self-destruction.

3. The autonomic system of claim 1, wherein the one or more resources comprises one or more power provisions.

4. The system of claim 3, wherein the one or more power provisions comprises at least one of a fuel cell, a fuel, a rocket, a rocket booster, a solar panel, a solar sail, a catalyst, a reactant, a reactor, an engine, a motor, a thruster, a drive, a magnet, and a combination thereof.

5. The system of claim 1, wherein at least one of the plurality of autonomic worker components is configured to self-sacrifice by donating a power provision to another one of the autonomic components.

6. The autonomic system of claim 1, wherein the plurality of autonomic components comprises one or more space exploration vehicles.

7. The autonomic system of claim 1, wherein the plurality of autonomic components comprises one or more deep sea exploration vehicles.

8. The autonomic system of claim 1, wherein at least one of the autonomic components comprises a magnetometer, at least one of the autonomic components comprises an X-ray analyzer, and at least one of the autonomic components comprises an infrared analyzer.

9. A method for managing an autonomic system comprising a plurality of autonomic components, the method comprising:

generating a signal indicative of a triggering condition pertaining to at least one of the autonomic components of the plurality of autonomic components; and causing the at least one autonomic component to decide to undergo a voluntary self-sacrifice procedure based on the occurrence of the triggering condition, wherein the voluntary self-sacrifice procedure comprises determining whether any resources are available that could be donated to another autonomic component of the plurality, donating the available resources to the other autonomic component, and then quiescing or self-destructing, wherein the triggering condition comprises one or more of:

an incorrect operation;

a determination of likelihood of jeopardizing a primary objective;

a failure to perform a self-configuration operation;

a failure to perform a self-healing operation;

a failure to perform a self-optimizing operation;

a failure to perform a self-protecting operation;

a failure to perform another self-operation; and a need to provide a resource to a more important autonomic component of the system, wherein an autonomic component is more important for being at least one of a necessary data collection device, a carrier of a scientific instrument, a carrier of an optical component, a unique component, or the like.

10. The method of claim 9, wherein the voluntary self-sacrifice operation comprises donating a power provision to the other autonomic component.

11. The method of claim 9, wherein the power provision comprises one or more of a fuel cell, a fuel, a rocket, a rocket booster, a solar panel, a solar sail, a catalyst, a reactant, a reactor, an engine, a motor, a thruster, a drive, a magnet, and a combination thereof.

12. The method of claim 9, wherein the voluntary self-sacrifice operation comprises determining whether any resource, available for donation, is compatible with the other autonomic component.

13. The method of claim 9, wherein the voluntary self-sacrifice operation comprises determining whether it is safe to self-destruct immediately at present location.

14. The method of claim 9, wherein the voluntary self-sacrifice procedure comprises determining that it is not safe to self-destruct immediately at present location, moving to a safe location for self-destruction, and self-destructing at the safe location.

15. The method of claim 9, wherein the voluntary self-sacrifice procedure comprises tethering or docking to another autonomic component of the plurality and connecting a power provision to the other autonomic component.

16. The method of claim 9, wherein at least one autonomic component of the plurality of autonomic components comprises a space exploration vehicle.

17. The method of claim 9, wherein at least one of the autonomic components comprises a deep sea exploration vehicle.

18. The method of claim 9, wherein at least one of the autonomic components comprises a magnetometer, at least one of the autonomic components comprises an X-ray analyzer, and at least one of the autonomic components comprises an infrared analyzer.

19. An autonomic system, the autonomic system comprising:

a plurality of autonomic components, the plurality of autonomic components comprising a more important autonomic component and a plurality of less important autonomic components, the more important autonomic component being programmed to (i) generate a need-for-resource signal indicative of a need for one or more resources, and (ii) send the need-for-resource signal to one or more of the less important autonomic components, the less important autonomic components being programmed to decide to undergo a self-sacrifice procedure based on receipt of the need-for-resource signal from the more important autonomic component, wherein the self-sacrifice procedure comprises donating one or more resources to the more important autonomic component, wherein an autonomic component is more important for being at least one of a necessary data collection device, a carrier of a scientific instrument, a carrier of an optical component, an unique component, or the like, and wherein an autonomic component is less important for at least one of being damaged, not carrying a necessary data collection device, not carrying a scientific instrument, not carrying an optical component, being a duplicate component, not being an unique component, or the like.

20. The autonomic system of claim 19, wherein the self-sacrifice procedure further comprises self-destructing after donating one or more resources to the more important autonomic component, wherein an autonomic component is more important for being at least one of a necessary data collection device, a carrier of a scientific instrument, a carrier of an optical component, a unique component, or the like.

21. The autonomic system of claim 19, wherein the one or more resources comprises one or more power provisions.

22. The system of claim 21, wherein the one or more power provisions comprises at least one of a fuel cell, a fuel, a rocket, a rocket booster, a solar panel, a solar sail, a catalyst, a reactant, a reactor, an engine, a motor, a thruster, a drive, a magnet, and a combination thereof.

23. The autonomic system of claim 19, wherein the plurality of autonomic components comprises one or more space exploration vehicles.

24. A method for managing an autonomic system comprising a plurality of autonomic components, the method comprising:
generating a signal indicative of a need for a resource pertaining to a more important autonomic component of a plurality of autonomic components; and causing at least one less important autonomic component of the plurality to decide to undergo a voluntary self-sacrifice procedure based on receiving the signal indicative of a need for a resource, wherein the voluntary self-sacrifice procedure comprises determining whether a needed resource is available that could be donated to the more important autonomic component, and donating the needed resource to the more important autonomic component,
wherein an autonomic component is more important for being at least one of a necessary data collection device, a carrier of a scientific instrument, a carrier of an optical component, an unique component, or the like, and
wherein an autonomic component is less important for at least one of being damaged, not carrying a necessary data collection device, not carrying a scientific instrument, not carrying an optical component, being a duplicate component, not being an unique component, or the like.

25. The method of claim 24, wherein the voluntary self-sacrifice operation comprises donating a power provision to the more important autonomic component, wherein an autonomic component is more important for being at least one of a necessary data collection device, a carrier of a scientific instrument, a carrier of an optical component, an unique component, or the like.

26. The method of claim 25, wherein the power provision comprises one or more of a fuel cell, a fuel, a rocket, a rocket booster, a solar panel, a solar sail, a catalyst, a reactant, a reactor, an engine, a motor, a thruster, a drive, a magnet, and a combination thereof.

27. The method of claim 24, wherein the voluntary self-sacrifice operation comprises determining whether the resource, available for donation, is compatible with the more important autonomic component, wherein an autonomic component is more important for being at least one of a necessary data collection device, a carrier of a scientific instrument, a carrier of an optical component, an unique component, or the like.

28. The method of claim 24, wherein the voluntary self-sacrifice operation comprises determining whether it is safe to self-destruct immediately at present location.

29. The method of claim 24, wherein the voluntary self-sacrifice procedure comprises determining that it is not safe to self-destruct immediately at present location, moving to a safe location for self-destruction, and self-destructing at the safe location.

30. The method of claim 24, wherein the voluntary self-sacrifice procedure comprises tethering or docking to the more important autonomic component and connecting or transferring a power provision to the more important autonomic component.

* * * * *